UNITED STATES PATENT OFFICE.

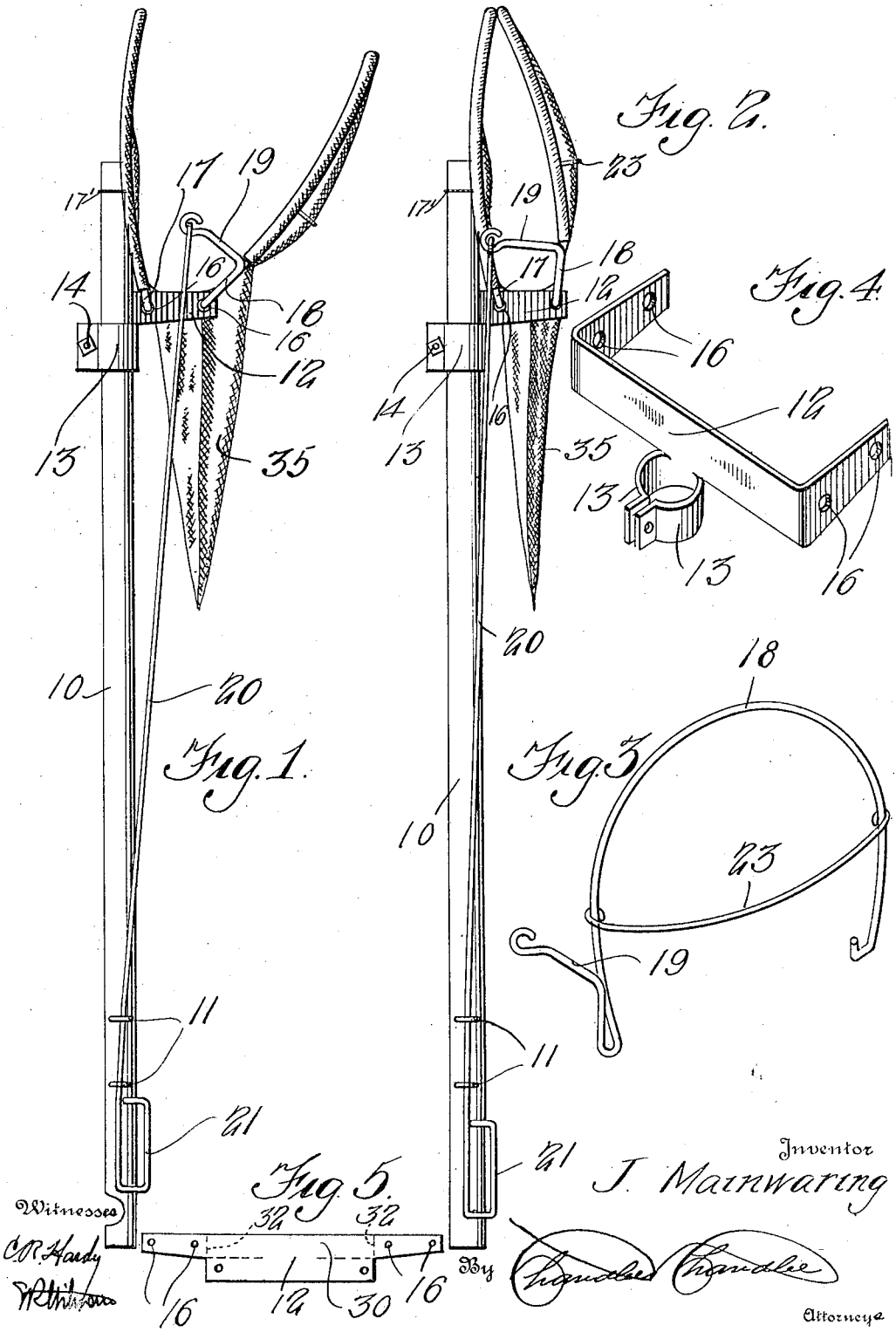

JOHN MAINWARING, OF SPRING GREEN, WISCONSIN.

FRUIT-PICKER.

1,241,642.  Specification of Letters Patent.  Patented Oct. 2, 1917.

Application filed June 4, 1917. Serial No. 172,787.

*To all whom it may concern:*

Be it known that I, JOHN MAINWARING, a citizen of the United States, residing at Spring Green, in the county of Sauk, State of Wisconsin, have invented certain new and useful Improvements in Fruit-Pickers; and I do hereby declare the following to be a full, clear, and exact description of the invention, such as will enable others skilled in the art to which it appertains, to make and use the same.

This invention relates to new and useful improvements in devices for gathering fruit, and has for its primary object to provide a device of this character by means of which the fruit may be gathered without injury thereto.

A further object of the invention is to provide a device of this character in which the fruit gathered is carried in a pocket or receptacle provided therefor, thus permitting of a considerable number of pieces of fruit being gathered without bringing the picking device from the tree.

A further object of the invention is to provide a device of this character which is simple in operation and cheap to manufacture.

Referring to the drawings, etc.,

Figure 1 is a side elevation of the device in its open position,

Fig. 2 is a similar view of the device in its closed position,

Fig. 3 is a view of the frame with the coverings removed,

Fig. 4 is a detail view of the bracket member, and;

Fig. 5 is a detail view of the blank from which the bracket is formed.

Referring more particularly to the drawings the device comprises a light pole or handle 10 which is provided along its length with a plurality of spaced eyes 11 the purpose of which will be hereinafter set forth.

Adjustably secured to the handle member, there is a bracket 12 which includes two pole engaging members 13 which are adapted to be clamped around the pole by a set screw or the like 14. Carried by these pole engaging members, there is a substantially U-shape member the legs of which are provided with perforations 16, and mounted in one set of perforations 16 there is a looped frame 17 which may be formed of wire, and the ends of said wire being bent within the openings 16 to secure the frame member in place upon the bracket. A cord or other retaining member 17' extends from the frame 17 about the handle 10 and holds the frame against movement with respect to the bracket and handle.

Mounted in the other pair of openings 16 there is a similar frame member 18 the ends bent in such a manner that they form a means by which the said frame is pivotally mounted in the bracket. One end of the wire frame member 18 is extended as at 19 to form an operating crank by which the frame member is rocked, and connected to said operating crank and extending through the eyes 11 in the handle there is an operating rod 20 the lower end of which is provided with a hand hold 21.

The frame member 17 is further braced with the transversely extending strip of wire 23 which is slightly curved, and both of said frame members are covered with cloth or suitable flexible material and the transverse brace 23 of the frame member 17 is slightly bent to permit of the grasping of the fruit without injury thereto.

The bracket 12 is formed from a blank 30 of sheet metal which is substantially the shape shown in Fig. 5, and said blank is cut along the dotted lines 31 to provide the pole engaging arms which serve to secure the bracket in place. The body portion of the bracket is then bent along the dotted lines 32 to form the right angular extensions in which the frame members are mounted.

Depending from the frame members there is a pocket or the like 35, the open end of said pocket being positioned at the base of the frame members. This pocket 35 is formed of cloth or other flexible material and may be of any desired size.

In operation, the hand hold of the rod is grasped and the frame member 17 is rocked to the position shown in Fig. 1. The frame members are then passed around the fruit, and the hand member is operated to close the top part of the frame members against the stem of the fruit. With the device in this position it is merely necessary to pull slightly and the fruit will be severed from the branch on which it grows and by moving the frame member 17 to the open position, the fruit will be deposited in the pocket 35. When said pocket has been filled with fruit, the fruit may be removed from the pocket 35 and deposited in any suitable receptacle.

Having thus described the invention what is claimed is,

1. A device of the character described comprising in combination, a handle, a bracket removably secured to said handle, a pair of spaced legs projecting angularly from said bracket, a frame member carried by the legs of said bracket in fixed relation thereto, a second frame member pivotally carried by the legs of said bracket, a pocket depending from said frame members, and means for rocking the pivoted frame member in its bearings.

2. A device of the character described comprising in combination with a pole or handle, a bracket member comprising a pair of pole engaging ears, means passing through said ears for securing the bracket to the pole, a body portion extending at right angles to the securing ears, a pair of legs projecting from said body portion and provided with alined spaced perforations, a frame mounted at the other two of said spaced perforations, and held against pivotal movement therein, a second frame pivotally mounted at the other two of said spaced perforations, a crank projecting from the pivoted frame, and means connected with said crank for rocking the pivoted frame about its pivotal point.

In testimony whereof, I affix my signature in the presence of two witnesses.

JOHN MAINWARING.

Witnesses:
 W. P. PURDY,
 H. C. PURDY.

Copies of this patent may be obtained for five cents each, by addressing the "Commissioner of Patents, Washington, D. C."